(12) United States Patent
Minoshima et al.

(10) Patent No.: US 9,120,416 B2
(45) Date of Patent: Sep. 1, 2015

(54) CONVEYANCE VEHICLE

(71) Applicant: HITACHI CONSTRUCTION MACHINERY CO., LTD., Tokyo (JP)

(72) Inventors: Toshikazu Minoshima, Ushiku (JP); Takanobu Ikari, Tsuchiura (JP); Takashi Yagyuu, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/232,647

(22) PCT Filed: Nov. 2, 2012

(86) PCT No.: PCT/JP2012/078507
§ 371 (c)(1),
(2) Date: Jan. 14, 2014

(87) PCT Pub. No.: WO2013/073391
PCT Pub. Date: May 23, 2013

(65) Prior Publication Data
US 2014/0159466 A1 Jun. 12, 2014

(30) Foreign Application Priority Data
Nov. 15, 2011 (JP) ................................. 2011-249496

(51) Int. Cl.
*B60P 1/04* (2006.01)
*G06F 19/00* (2011.01)
(Continued)

(52) U.S. Cl.
CPC .. *B60P 1/16* (2013.01); *B60P 1/283* (2013.01)

(58) Field of Classification Search
CPC .......... B62D 15/021; B62D 5/06; B62D 5/09; B62D 6/008; B60P 1/162; B60P 1/283; B60P 1/04; B60P 1/16; B60K 17/046; B60K 11/00; B60K 1/00; B60K 6/46; B60K 7/007
USPC ........................... 298/22 C, 22 R, 17 R, 19 R
See application file for complete search history.

(56) References Cited

U.S. PATENT DOCUMENTS 5,020,857 A * 6/1991 Bertelson ..................... 298/22 R
5,065,569 A * 11/1991 Schlueter ....................... 56/16.6
(Continued)

FOREIGN PATENT DOCUMENTS

JP       7-23644 U     5/1995
JP       10-151981 A     6/1998
(Continued)

*Primary Examiner* — Glenn Dayoan
*Assistant Examiner* — Sunsurraye Westbrook
(74) *Attorney, Agent, or Firm* — Mattingly & Malur, PC

(57) ABSTRACT

A loading platform is capable of tilting on a vehicle body. In accordance with a position of an operating lever for operating a hoist cylinder for tilting the loading platform and ON/OFF of a limit change switch operated by an operator, a running speed of the vehicle body is limited. If the loading platform is not seated and the limit change switch is OFF, the running speed is limited to a first speed limit or less which is low speed running. If the loading platform is not seated and the limit change switch is ON, when the operating lever is at a lowering position or a floating position, change of the speed limit to a second speed limit faster than the first speed limit is allowed. When the operating lever is at a raising or holding position, the change of the speed limit from the first speed limit is prohibited.

4 Claims, 4 Drawing Sheets

(51) Int. Cl.
  *B60P 1/16* (2006.01)
  *B60P 1/28* (2006.01)

(56) References Cited

U.S. PATENT DOCUMENTS

| | | | |
|---|---|---|---|
| 5,742,228 A * | 4/1998 | Levy | 340/429 |
| 7,604,300 B2 * | 10/2009 | Whitfield et al. | 298/22 C |
| 2002/0047300 A1 * | 4/2002 | Uematsu et al. | 298/22 R |
| 2010/0026079 A1 | 2/2010 | Nabeshima et al. | |

FOREIGN PATENT DOCUMENTS

| | | |
|---|---|---|
| JP | 2001-105955 A | 4/2001 |
| JP | 2006-256444 A | 9/2006 |
| JP | 2009-166669 A | 7/2009 |
| JP | 2009-262750 A | 11/2009 |
| JP | 2010-137696 A | 6/2010 |
| WO | 2008-099691 A1 | 8/2008 |

* cited by examiner

CONVEYANCE VEHICLE

TECHNICAL FIELD

The present invention relates to a conveyance vehicle such as a dump truck and the like suitably used for transportation of mined crushed stones, excavated earth and sand and the like at an open-air stope, quarry, mine and the like, for example.

BACKGROUND ART

A large-sized conveyance vehicle called a dump truck is generally provided with a loading platform called a vessel capable of being tilted in upward and downward directions by using a rear side as a fulcrum on a frame of a vehicle body. The conveyance vehicle is to transport and convey a load to be transported to a transportation destination (an unloading site, a load collecting site) in a state in which the load (crushed stones, earth and sand, for example) is loaded on this loading platform in a large quantity (Patent Document 1).

The conveyance vehicle according to this type of conventional art is composed of an automotive vehicle body, a loading platform provided on a vehicle body for loading a load, capable of tilting (rise and fall) by using the rear side as a fulcrum, and a hoist cylinder provided between the loading platform and the vehicle body and tilting the loading platform upward or downward by extending or contracting when the load is to be discharged from the loading platform.

Such a conveyance vehicle runs to the transportation destination in the state loaded with a load in the loading platform and then, rotationally moves the loading platform upward by extending the hoist cylinder and discharges the load to the unloading site along a tilting direction of the loading platform by this raising operation. On the other hand, after the discharging operation is finished, the hoist cylinder is driven in a contracting direction or the hoist cylinder is contracted by its own weight on the loading platform side, for example. Therefore, the loading platform falls so as to gradually lower to a position where the loading platform is seated on the vehicle body.

Incidentally, running in the state in which the loading platform is not seated on the vehicle body is not preferable since it is concerned that the loading platform might touch an obstacle such as an electric wire, a piping and the like, for example. Patent Document 2 discloses a vessel raised running preventing device configured such that if a tilting angle of the loading platform is at a predetermined angle or more, an accelerator pedal is locked by an actuator, and if the tilting angle of the loading platform is at the predetermined angle or more, normal running is prohibited.

PRIOR ART DOCUMENT

Patent Document

Patent Document 1: Japanese Patent Laid-Open No. 2009-262750 A
Patent Document 2: Japanese Patent Laid-Open No. Hei 10-151981 A

SUMMARY OF THE INVENTION

The vessel raised running preventing device according to Patent Document 2 can unlock the accelerator pedal only by pressing a predetermined button by an operator even if the tilting angle of the loading platform is the predetermined angle or more. Thus, if the operator checks that there is no concern for the loading platform to touch an obstacle and presses the predetermined switch, for example, normal running can be performed even if the tilting angle of the loading platform is the predetermined angle or more.

However, according to such conventional art, even if the tilting angle of the loading platform is the predetermined angle or more and the load is loaded on the loading platform, normal running including high-speed running can be performed only if the operator presses the predetermined switch. In this case, it is concerned that the normal running is performed in a state in which a large load is applied on a support shaft tiltably supporting the loading platform on the rear side of the loading platform. As a result, there is a problem that durability and a life of the support shaft are lowered, and the support shaft should be replaced earlier than usual.

The present invention was made in view of the aforementioned problem of the conventional art and has an object to provide a conveyance vehicle which can improve durability and reliability.

(1) In order to solve the aforementioned problems, the present invention is applied to a conveyance vehicle comprises an automotive vehicle body; a loading platform provided capable of tilting in upward and downward directions by using a rear side of the vehicle body as a fulcrum; a loading platform tilting device provided between the loading platform and the vehicle body and tilting the loading platform upward or downward; a command signal output unit for outputting a command signal to the loading platform tilting device for tilting the loading platform in the upward and downward directions; a seated state detector for detecting a state in which the loading platform is seated on the vehicle body; a speed limiting unit for limiting a running speed of the vehicle body in case it is determined that the loading platform is not seated on the basis of a detection result of the seated state detector; and a limit change switch for allowing change of limitation on a running speed by the speed limiting unit by an operation by an operator; in which the command signal output unit is configured to output a raising command signal for rotationally moving the loading platform upward, a lowering command signal for rotationally moving the loading platform downward, a floating command signal for allowing fall of the loading platform by its own weight on the loading platform side, and a maintaining command signal for stopping movement of the loading platform.

A characteristic of a configuration adopted by the present invention is that, the speed limiting unit limits the running speed of the vehicle body to a first speed limit or less which is low speed running in case it is determined that the loading platform is not seated and also that the limit change switch has not been operated; the speed limiting unit changes the speed limit to a second speed limit which is faster than the first speed limit in case it is determined that the loading platform is not seated, that the limit change switch has been operated, and that a command signal of the command signal output unit is the lowering command signal or the floating command signal; and the speed limiting unit prohibits change of the speed limit from the first speed limit to the second speed limit in case it is determined that the loading platform is not seated, that the limit change switch has been operated, and that the command signal of the command signal output unit is the raising command signal or the maintaining command signal.

With this arrangement, if the operator has not operated the limit change switch and the loading platform is not seated on the vehicle body, the running speed is limited to the first speed limit or less which is the low speed running by the speed limiting unit. Moreover, even if the operator has operated the limit change switch, when the loading platform is not seated on the vehicle body and the raising command signal or the maintaining command signal which can continue (maintain) the state in which the loading platform is raised by the loading platform tilting device is outputted by the command signal output unit, change to the second speed limit which is faster than the first speed limit is prohibited by the speed limiting unit.

Therefore, in the state in which the loading platform is not seated on the vehicle body and the loading platform can be kept in the raised state (a raising command state, a maintaining command state), even if the operator operates the limit change switch, running at a speed exceeding the first speed limit is prevented by the speed limiting unit. Thus, in the state in which the loading platform is not seated on the vehicle body and a large load is applied to the support shaft such as a state in which a load is loaded on the loading platform, running at a speed exceeding the first speed limit can be prevented. As a result, deterioration of durability and life of the support shaft can be suppressed, and a replacement period of the support shaft can be extended and thus, durability and reliability of the conveyance vehicle can be improved.

It should be noted that if the loading platform is not seated on the vehicle body and the command signal output unit outputs the lowering command signal or the floating signal for seating the loading platform by the loading platform tilting device, the speed limit is the second speed limit faster than the first speed limit in accordance with the operation of the limit change switch by the operator. In this case, the vehicle can run at the speed of the second speed limit or less desired by the operator.

(2) According to the present invention, the limit change switch is constituted by a momentary switch which is kept ON while the operator presses the same and is automatically returned to an OFF state when the operator releases the switch.

With this arrangement, it can be configured such that the speed limit cannot be changed to the second speed limit or less unless the operator keeps on pressing the limit change switch. As a result, a situation in which the limit change switch is unexpectedly kept in the ON state though the operator does not want to change the speed limit can be prevented, and possibility of an erroneous operation by the operator can be reduced.

(3) According to the present invention, the first speed limit is set at 3 to 7 km/h and the second speed limit is set at 8 to 12 km/h.

With this arrangement, since the first speed limit is set at 3 to 7 km/h, durability and life of the support shaft can be ensured. On the other hand, since the second speed limit is set at 8 to 12 km/h, if the operator wants to change the speed limit, the vehicle can run at the running speed required by the operator.

(4) According to the present invention, the loading platform tilting device is a hoist cylinder operated by supply and discharge of a pressurized oil from a control valve device composed of a hydraulic pilot type directional control valve; and the command signal output unit is composed of an operating lever device for outputting a pilot pressure as a command signal to the control valve device. With this arrangement, a signal corresponding to each of the raising command signal, the lowering command signal, the floating command signal, and the maintaining command signal can be outputted as a pilot pressure from the operating lever device to the control valve device. The control valve device supplies/discharges the pressurized oil in accordance with the pilot pressure and operates the hoist cylinder.

MODE FOR CARRYING OUT THE INVENTION

Figure 1:
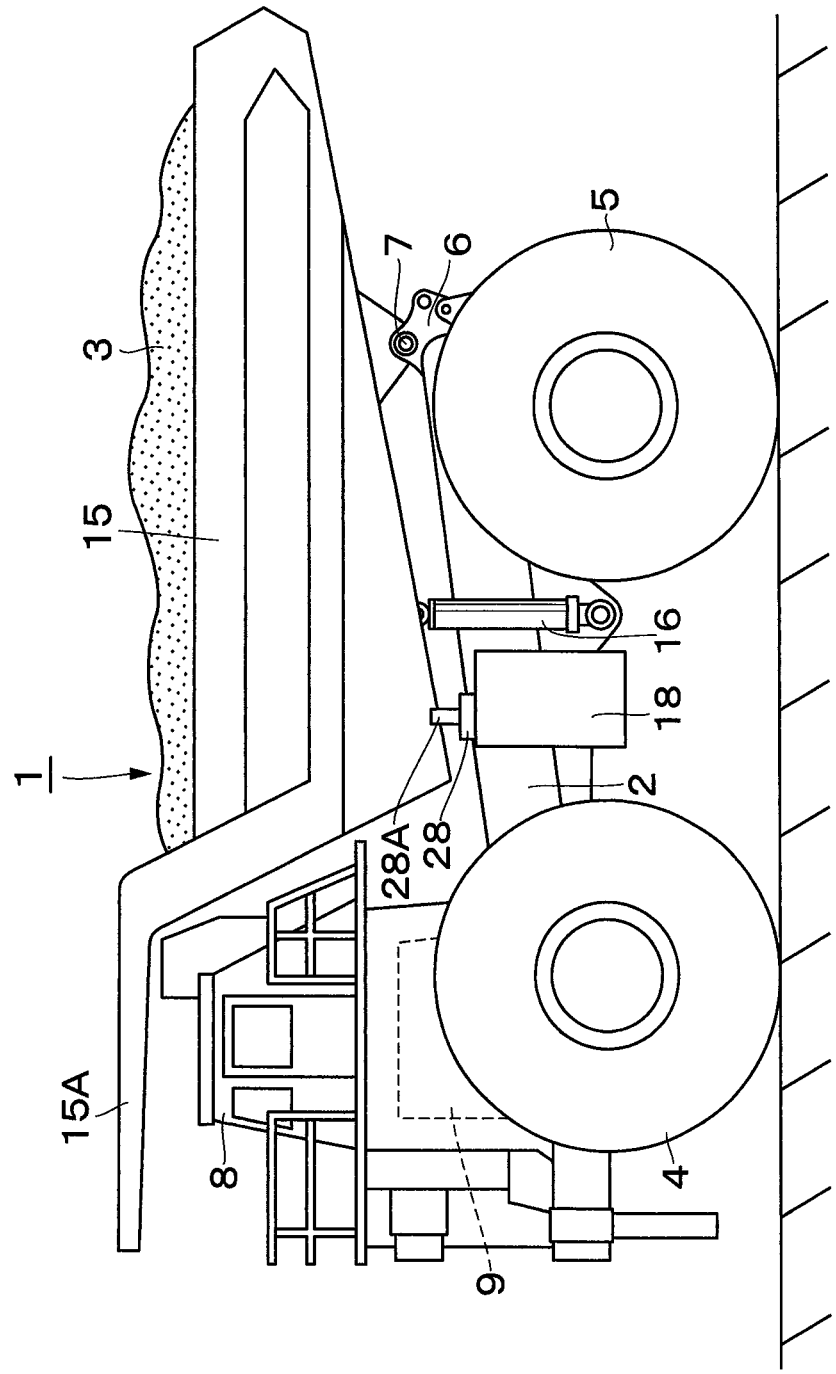
FIG. 1 is a front view illustrating a dump truck according to an embodiment of the present invention.

A conveyance vehicle according to an embodiment of the present invention will be described below in detail in accordance with the attached drawings by using a dump truck for transporting crushed stones, earth and sand and the like mined in a mine as an example.

In the figure, designated at 1 is a dump truck which is a large-sized conveyance vehicle, and the dump truck 1 is largely composed of an automotive vehicle body 2, a loading platform 15 which will be described later and is supported by the vehicle body 2 capable of tilting (rotational movement) and loads a load such as crushed stones, earth and sand and the like (hereinafter, referred to as earth and sand 3), and a hoist cylinder 16 which will be described later for discharging the earth and sand by tilting the loading platform 15 with respect to the vehicle body 2.

Here, left and right front wheels 4 are rotatably provided on the front side of the vehicle body 2. The front wheel 4 is formed having a tire diameter (outer diameter dimension) of 2 to 4 m, for example, similarly to a rear wheel 5 which will be described later and constitutes a steering wheel which is steered and operated by a driver of the dump truck 1.

Left and right rear wheels 5 are rotatably provided on the rear side of the vehicle body 2. The rear wheel 5 constitutes a driving wheel of the dump truck 1 and is rotated and driven by a wheel drive motor 13 which will be described later. The dump truck 1 runs on the road by rotating and driving of the rear wheel 5.

Moreover, a cab 8, an engine 9 and the like which will be described later are provided on the front side of the vehicle body 2, and a loading platform support bracket 6 for supporting the rear side of the loading platform 15 which will be described later is provided on a rear part of the vehicle body 2. The loading platform support bracket 6 supports the loading platform 15 capable of tilting through a support shaft 7 which is a connecting pin. The support shaft 7 serves as a fulcrum (center of rotational movement) when the loading platform 15 is tilted upward or downward by extending or contracting the hoist cylinder 16 which will be described later.

The cab 8 is provided on a front part of the vehicle body 2. This cab 8 forms an operator's cab which the operator (driver) of the dump truck 1 gets on, and inside the cab 8, an operator's seat, a start switch, an accelerator pedal, a brake pedal, a steering wheel (none of them is shown), an operating lever 26A and a limit change switch 29 (See FIG. 3) and the like which will be described later are provided.

Figure 3:
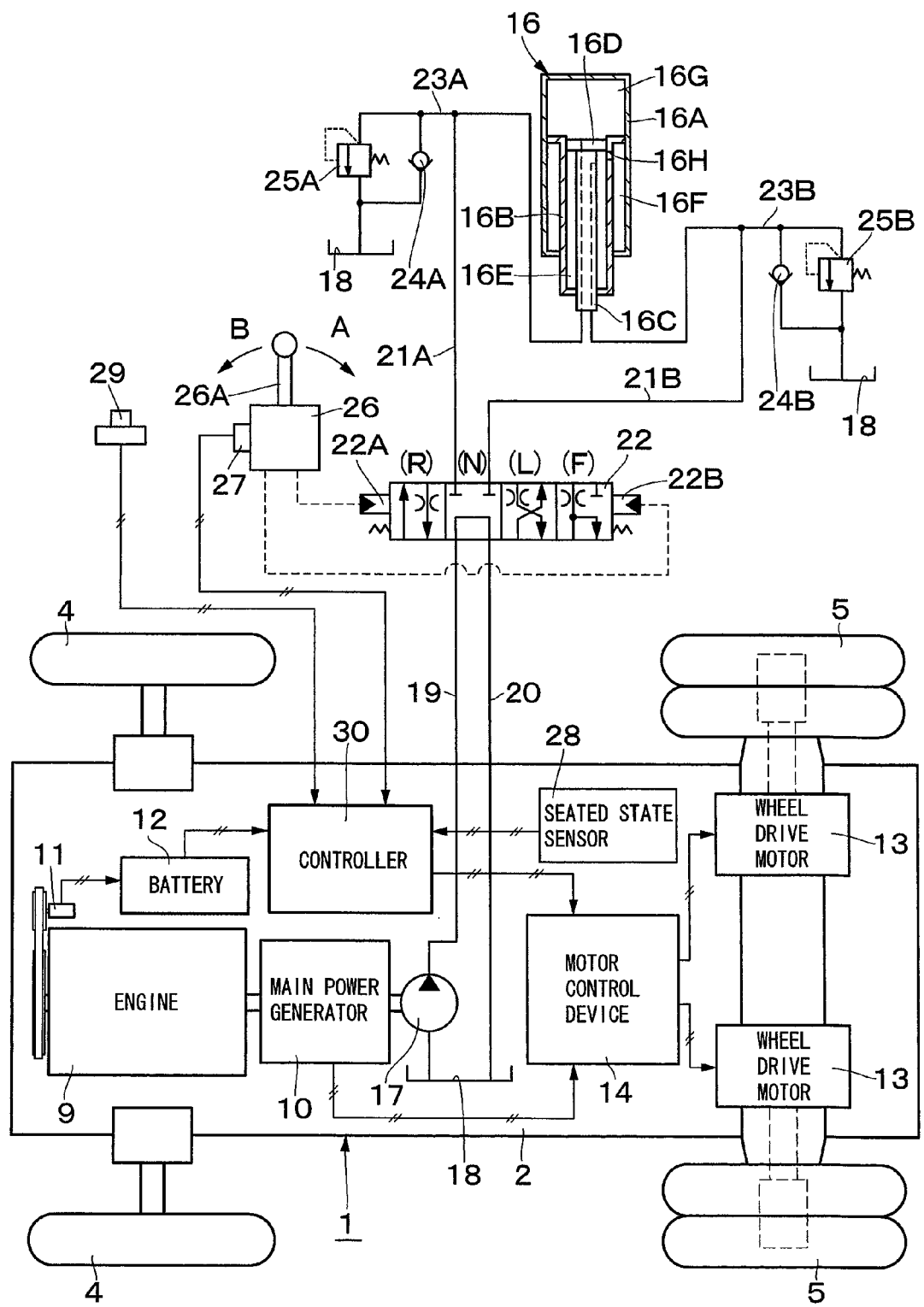
FIG. 3 is a circuit configuration diagram including a hydraulic circuit and an electric circuit for extending, contracting or stopping a hoist cylinder.

The engine 9 is provided on the vehicle body 2 by being located below the cab 8. This engine 9 is composed of a large-sized diesel engine, for example. As shown in FIG. 3, the engine 9 generates a 3-phase AC power (approximately 1500 kW, for example) by driving a main power generator 10 and also drives a DC auxiliary power generator 11. This auxiliary power generator 11 is connected to a battery 12 which is a power source of a controller 30 which will be described later and charges the battery 12. Moreover, the engine 9 also has a function of rotating and driving a hydraulic pump 17 which will be described later.

As shown in FIG. 3, left and right wheel drive motors 13 are provided on the lower rear side of the vehicle body 2, and each of the wheel drive motors 13 independently drives each of the rear wheels 5, respectively. Here, the wheel drive motor 13 is constituted by a large-sized electric motor formed of a 3-phase induction motor, a 3-phase brushless DC motor or the like and is rotated and driven by electric power supplied from the main power generator 10 through a motor control device 14.

That is, each of the wheel drive motors 13 is independently rotated and driven by the motor control device 14, respectively, and a control signal from the controller 30 which will be described later is inputted into the motor control device 14. The motor control device 14 is configured to execute control so that rotating speeds of the left and right rear wheels 5 are made the same when the vehicle travels forward or the rotating speeds of the left rear wheel 5 and the right rear wheel 5 are made different in accordance with a turning direction during turning on the basis of the control signal, for example.

Designated at 15 is the loading platform located on the rear side of the cab 8 and provided capable of tilting in the upward and downward directions by using the rear side of the vehicle body 2 as a fulcrum. The loading platform 15 is formed as a large-sized container having a bottomed box shape with the whole length of 10 to 13 m (meters) for loading a large quantity of the earth and sand 3, and a protector 15A covering the cab 8 from above is provided on the front side thereof. Here, the rear side of a bottom portion of the loading platform 15 is supported by the loading platform support bracket 6 of the vehicle body 2 by using the support shaft 7. The loading platform 15 is rotationally moved in the upward and downward directions by using the support shaft 7 as a fulcrum by extending or contracting the hoist cylinder 16 which will be described later. The loading platform 15 is tilted with respect to the vehicle body 2 by being rotationally moved from a lowering position (transport position) illustrated in FIG. 1 to a raising position (soil discharging position) illustrated in FIG. 2 so that the earth and sand 3 are made to slide down along this tilted loading platform 15. As a result, the large quantity of earth and sand 3 loaded on the loading platform 15 is discharged rapidly to a soil discharging site.

Designated at 16 are a pair of left and right hoist cylinders (only one of them is shown) as a loading platform tilting device provided between the vehicle body 2 and the loading platform 15. The hoist cylinder 16 tilts the loading platform 15 upward or downward by using the rear side as a fulcrum. As shown in FIG. 3, as the hoist cylinder 16, a multistage (two-stage, for example) type hydraulic cylinder or a so-called telescopic hydraulic cylinder is used. The hoist cylinder 16 is composed of an outer tube portion 16A located on the outside, an inner tube portion 16B provided capable of extension or contraction in the outer tube portion 16A, and a piston 16D integral with a piston rod 16C provided capable of extension or contraction in the inner tube portion 16B. The inside of the outer tube portion 16A of the hoist cylinder 16 is divided by the inner tube portion 16B, the piston rod 16C, and the piston 16D into three chambers, that is, rod side oil chambers 16E and 16F and a bottom side oil chamber 16G.

At this time, the rod side oil chamber 16F is made to communicate with either of the rod side oil chamber 16E and the bottom side oil chamber 16G through a port 16H provided in the inner tube portion 16B. That is, when the piston 16D of the hoist cylinder 16 is displaced in the inner tube portion 16B and the piston 16D is located on the upper side of the port 16H, as shown in FIG. 3, the rod side oil chamber 16F communicates with the rod side oil chamber 16E through the port 16H. On the other hand, if the piston 16D is displaced to a lower side position below the port 16H, the rod side oil chamber 16F communicates with the bottom side oil chamber 16G through the port 16H.

In the hoist cylinder 16, if a pressurized oil is supplied into the bottom side oil chamber 16G from the hydraulic pump 17, the inner tube portion 16B extends downward together with the piston rod 16C, and if the inner tube portion 16B extends to the maximum, the piston rod 16C further extends downward to a maximum extended position. As a result, the hoist cylinder 16 rotationally moves the loading platform 15 to the raising position (soil discharging position) where the loading platform 15 is tilted diagonally rearward by using the support shaft 7 as a fulcrum.

On the other hand, in the hoist cylinder 16, if the pressurized oil is supplied into the rod side oil chamber 16E from the hydraulic pump 17 in a state in which the piston rod 16C extends to the maximum, first, only the piston rod 16C and the piston 16D contract and then, the inner tube portion 16B contracts to a maximum contracted position together with the piston rod 16C. As a result, the hoist cylinder 16 rotationally moves the loading platform 15 to a lowering position (transport position) where the loading platform 15 is lowered downward by using the support shaft 7 as a fulcrum.

Subsequently, a hydraulic circuit for driving the hoist cylinder 16 will be described by referring to FIG. 3.

Figure 2:
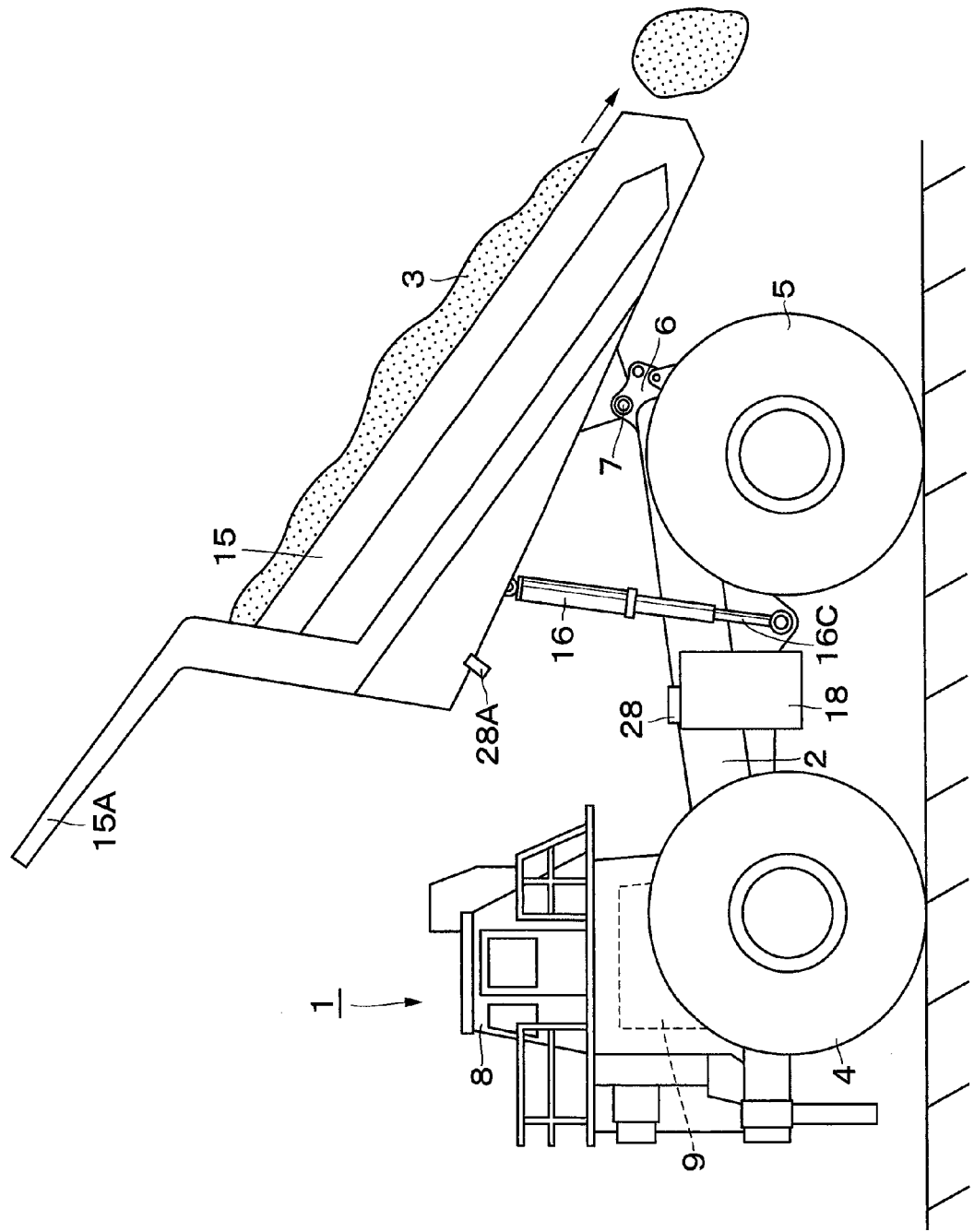
FIG. 2 is a front view illustrating a state in which a loading platform of the dump truck is tilted diagonally rearward.

The hydraulic pump 17 constitutes a hydraulic power source together with an operating oil tank 18 (hereinafter, referred to as a tank 18). As shown in FIGS. 1 and 2, the tank 18 is located below the loading platform 15 and is mounted on a side surface of the vehicle body 2. Here, the operating oil stored in the tank 18 is sucked into the hydraulic pump 17 when the hydraulic pump 17 is rotated and driven by the engine 9. A pressurized oil at a high pressure is delivered from a delivery side of the hydraulic pump 17 into a pump line 19. A return oil from the hoist cylinder 16 is discharged into the tank 18 through a tank line 20 at a low pressure.

Hydraulic lines 21A and 21B constitute a pair of main lines connected to the bottom side oil chamber 16G, the rod side oil chambers 16E and 16F of the hoist cylinder 16. The hydraulic lines 21A and 21B are connected to the hydraulic pressure source (the hydraulic pump 17, the tank 18), respectively, through a control valve device 22 which will be described later. A tip end side of the hydraulic line 21A is connected to the bottom side oil chamber 16G of the hoist cylinder 16 through the piston rod 16C of the hoist cylinder 16. A tip end side of the hydraulic line 21B is connected to the rod side oil chamber 16E through the piston rod 16C. The rod side oil chamber 16F of the hoist cylinder 16 is made to communicate with the rod side oil chamber 16E or the bottom side oil chamber 16G through the port 16H in accordance with a sliding position of the piston 16D.

The control valve device 22 is provided among the hydraulic pump 17, the tank 18, and the hoist cylinder 16. As shown in FIG. 3, the control valve device 22 is constituted by a hydraulic pilot type directional control valve having 4 ports and 4 positions, for example. That is, the control valve device 22 is constituted by using a single directional control valve and has hydraulic pilot portions 22A and 22B on both left and right sides.

The control valve device 22 is held at a neutral position (N) in normal times among a plurality of switching positions, that is, the neutral position (N), a raising position (R), a lowering position (L), and a floating position (F). As shown in FIG. 3, the control valve device 22 at the neutral position (N) shuts off the pump line 19 and the tank line 20 with respect to the hydraulic lines 21A and 21B so as to stop supply/discharge of the pressurized oil and to stop movement of the hoist cylinder 16. Such neutral position (N) is to stop movement of the loading platform 15 and to hold the loading platform 15 at a position where the movement is stopped and thus, it is also called a holding position.

When a pilot pressure is supplied from an operating lever device 26 which will be described later to the hydraulic pilot portion 22A, the control valve device 22 is switched from the neutral position (N) to the raising position (R). The control valve device 22 switched to the raising position (R) makes the pump line 19 communicate with the hydraulic line 21A and the tank line 20 communicate with the hydraulic line 21B. As a result, regarding the hoist cylinder 16, the pressurized oil is supplied to the bottom side oil chamber 16G, and an oil liquid in the rod side oil chambers 16E and 16F is discharged to the tank 18 side, and the piston rod 16C is driven in a direction to extend from the outer tube portion 16A and the inner tube portion 16B, that is, in a direction to raise the loading platform 15.

If the pilot pressure is supplied from the operating lever device 26 to the hydraulic pilot portion 22B, the control valve device 22 is switched from the neutral position (N) to the lowering position (L). The control valve device 22 having been switched to the lowering position (L) makes the pump line 19 communicate with the hydraulic line 21B and the tank line 20 communicate with the hydraulic line 21A. As a result, regarding the hoist cylinder 16, the pressurized oil is supplied to the rod side oil chambers 16E and 16F sides, the oil liquid in the bottom side oil chamber 16G is discharged to the tank 18 side, and the piston rod 16C is driven in a direction to contract into the outer tube portion 16A and the inner tube portion 16B, that is, in a direction to lower the loading platform 15.

Moreover, if a larger pilot pressure is supplied from the operating lever device 26 which will be described later to the hydraulic pilot portion 22B, for example, the control valve device 22 is switched from the neutral position (N) to the floating position (F) through the lowering position (L). The control valve device 22 having been switched to the floating position (F) makes the hydraulic line 21A communicate with both the pump line 19 and the tank line 20 and shuts off the hydraulic line 21B to the both. As a result, regarding the hoist cylinder 16, the oil liquid in the bottom side oil chamber 16G is discharged to the tank 18 side, and the oil liquid in the tank 18 is supplied into the rod side oil chambers 16E and 16F from a bypass line 23B side which will be described later. As a result, the hoist cylinder 16 contracts by its own weight on the loading platform 15 side, and fall by its own weight of the loading platform 15 is allowed.

The bypass lines 23A and 23B are provided between the hydraulic lines 21A and 21B and the tank 18, respectively, by bypassing the control valve device 22. One bypass line 23A of these bypass lines 23A and 23B has one side connected to a middle portion of the hydraulic line 21A and the other side connected to the tank 18. The other bypass line 23B has one side connected to the middle portion of the hydraulic line 21B and the other side connected to the tank 18.

Here, in the one bypass line 23A, a check valve 24A for make-up and a relief valve 25A for overload prevention are provided by being connected in parallel at the middle positions thereof. The relief valve 25A is opened in order to relieve an overpressure on the bottom side oil chamber 16G side if an overload in the contracting direction acts on the hoist cylinder 16. The check valve 24A allows a flow of the oil liquid in the tank 18 toward the bottom side oil chamber 16G of the hoist cylinder 16 through the hydraulic line 21A and prevents a flow in the opposite direction. Thus, the bottom side oil chamber 16G in the hoist cylinder 16 is replenished with the oil liquid through the check valve 24A if the inside tends to have a negative pressure.

In the other bypass line 23B, too, a check valve 24B for make-up and a relief valve 25B for overload prevention are provided by being connected in parallel at the middle positions thereof similarly to the one bypass line 23A. The relief valve 25B is opened in order to relieve an overpressure on the rod side oil chambers 16E and 16F sides if an overload in the extending direction acts on the hoist cylinder 16. The check valve 24B allows a flow of the oil liquid in the tank 18 toward the rod side oil chambers 16E and 16F of the hoist cylinder 16 through the hydraulic line 21B and prevents a flow in the opposite direction. Thus, the rod side oil chambers 16E and 16F in the hoist cylinder 16 are replenished with the oil liquid through the check valve 24B if the inside tends to have a negative pressure.

Designated at 26 is the operating lever device as the command signal output unit, and the operating lever device 26 outputs a command signal for tilting the loading platform 15 in the upward and downward directions. Specifically, the operating lever device 26 is constituted by a reducing valve type pilot valve, for example, and has the operating lever 26A operated by the operator in the cab 8. The operating lever device 26 switches the control valve device 22 by supplying the pilot pressure as the command signal to the hydraulic pilot portions 22A and 22B of the control valve device 22 in accordance with the operation to the operating lever 26A.

In this case, if the operating lever 26A is operated in an arrow A direction and set at a loading platform raising position, the pilot pressure as a raising command signal for rotationally moving the loading platform 15 upward is supplied to the hydraulic pilot portion 22A of the control valve device 22 from the operating lever device 26. As a result, the control valve device 22 is switched to the loading platform raising position (R). On the other hand, if the operating lever 26A is operated by one stage in an arrow B direction and set at a loading platform lowering position, for example, the pilot pressure as a lowering command signal for lowering the loading platform 15 is supplied to the hydraulic pilot portion 22B of the control valve device 22 from the operating lever device 26. As a result, the control valve device 22 is switched to the loading platform lowering position (L).

Moreover, if the operating lever 26A is operated in two stages in the arrow B direction and set at the floating position, for example, the pilot pressure as a floating command signal for allowing free fall of the loading platform 15 by the weight of the loading platform 15 is supplied to the hydraulic pilot portion 22B of the control valve device 22 from the operating lever device 26. As a result, the control valve device 22 is switched to the floating position (F).

Moreover, if the operating lever 26A is operated to the holding position (neutral position) shown in FIG. 3 from the operating position of the arrows A and B, the pilot pressure as a holding command signal for stopping movement of the loading platform 15 is supplied to the hydraulic pilot portions 22A and 22B of the control valve device 22, respectively, from the operating lever device 26. As a result, the control valve device 22 is switched to the neutral position (N).

An operating lever sensor 27 is provided on the operating lever device 26, and the operating lever sensor 27 outputs a detection signal according to the operated position (command signal) of the operating lever 26A to the controller 30 which will be described later. Specifically, the operating lever sensor 27 outputs a signal indicating the position corresponding to any one of the raising position, the lowering position, the floating position, and the holding position (neutral position) which are operated positions of the operating lever 26A to the controller 30, for example.

Designated at 28 is a seated state sensor as a seated state detector for detecting a state in which the loading platform is seated on the vehicle body 2 (if the loading platform 15 is seated or not, for example). As shown in FIGS. 1 and 2, the seated state sensor 28 is constituted by a contact sensor (a pressure sensor, a pressure switch, for example) located between the loading platform 15 and the vehicle body 2 and installed on the upper side of the vehicle body 2 and detects whether a projecting object 28A to be detected and provided on the loading platform 15 side is in contact or is separated. That is, the seated state sensor 28 detects a behavior of the loading platform 15 on the vehicle body 2 (in what state the loading platform 15 is). When the loading platform 15 is seated on the vehicle body 2, the seated state sensor 28 outputs a seated state signal to the controller 30 which will be described later. On the other hand, incase the loading platform 15 is separated from the vehicle body 2, the seated state sensor 28 is configured not to output the seated state signal.

It should be noted that, in this embodiment, the state in which the loading platform 15 is seated on the vehicle body 2 is detected by the seated state sensor 28. However, instead of the seated state sensor 28 with such configuration, a tilting angle sensor for detecting a tilting angle of the loading platform 15 or a stroke sensor for detecting stroke length of the hoist cylinder 16 may be configured, for example. In this case, it may be so configured that the seated state of the loading platform 15 is detected on the basis of whether or not the tilting angle of the loading platform 15 or the stroke length of the hoist cylinder 16 has become a value corresponding to the state in which the loading platform 15 is seated, for example. In other words, various types of detectors (sensor, switch and the like) can be used as the seated state detector as long as the state in which the loading platform 15 is seated on the vehicle body 2 can be detected.

Designated at 29 is a limit change switch (See, FIG. 3) called an override switch provided in the vicinity of the operator's seat in the cab 8. The limit change switch 29 is connected to the controller 30 which will be described later and outputs a signal indicating that the speed limit of the vehicle body 2 (dump truck 1) is to be changed to the controller 30 by the operation by the operator. That is, if the operator operates the limit change switch 29, an on-operation signal (ON signal) indicating that the switch 29 has been operated is outputted from the limit change switch 29 to the controller 30. As a result, the controller 30 enables a change of a speed limit in accordance with a condition which will be described later (in accordance with a position of the operating lever 26A) from the first speed limit (5 km/h, for example) or less to a second speed limit (10 km/h, for example) which is faster than that.

Here, the limit change switch 29 is constituted by a momentary switch, and this limit change switch 29 is kept on while it is pressed by the operator and outputs the on-operation signal (ON signal). On the other hand, the limit change switch 29 automatically returns to an OFF state if the operator releases it. Thus, if the operator wants to change the speed limit to the second speed limit or less, the operator needs to keep on pressing the limit change switch 29. As a result, a state in which the limit change switch 29 is inadvertently brought into the ON state even though the operator does not want to change the speed limit can be prevented, and possibility of an erroneous operation by the operator can be reduced.

Designated at 30 is the controller (control unit) formed of a microcomputer, and the controller 30 has its input side connected to the battery 12, the operating lever sensor 27, the seated state sensor 28, the limit change switch 29 and the like. An output side of the controller 30 is connected to a motor control device 14 and the like. The controller 30 has a memory (not shown) composed of a ROM, a RAM and the like, and a processing program for limiting a running speed and data including numeral values of the first speed limit and the second speed limit set in advance illustrated in FIG. 4 which will be described later are stored in this memory.

The controller 30 executes control of limiting the running speed of the dump truck 1 in accordance with a processing program in FIG. 4 which will be described later. That is, if it is determined that the loading platform 15 is not seated on the basis of the detection result of the seated state sensor 28, the controller 30 limits the running speed of the vehicle body 2. Specifically, if it is determined that the loading platform 15 is not seated on the basis of the detection result of the seated state sensor 28 and also that the limit change switch 29 has not been operated, the controller 30 limits the running speed of the vehicle body 2 to the first speed limit or less which is low speed running (the speed limit cannot be changed). In this case, the first speed limit can be set at 3 to 7 km/h or more preferably at 5 km/h, for example.

On the other hand, if it is determined that the loading platform 15 is not seated on the basis of the detection result of the seated state sensor 28 and also that the limit change switch 29 has been operated, the controller 30 determines the speed limit in accordance with the command signal of the operating lever device 26, or in other words, the position of the operating lever 26A detected by the operating lever sensor 27. Specifically, if the command signal of the operating lever device 26 is determined to be the lowering command signal or the floating command signal, that is, if it is determined that the position of the operating lever 26A is at the position where the switched position of the control valve device 22 is set at the lowering position (L) or the floating position (F), the controller 30 sets the speed limit to the second speed limit or less faster than the first speed limit (the speed limit is changed). In this case, the second speed limit can be set at 8 to 12 km/h or more preferably at 10 km/h, for example.

On the other hand, if the command signal of the operating lever device 26 is determined to be the raising command signal or the holding command signal, that is, if it is determined that the position of the operating lever 26A is the position where the switched position of the control valve device 22 is set at the raising position (R) or the neutral position (N), the controller 30 sets the speed limit to the first speed limit or less (the speed limit cannot be changed). In other words, change of the speed limit to the second speed limit faster than the first speed limit is prohibited.

As a result, if the loading platform 15 is not seated on the vehicle body 2 and also the load is loaded on the loading platform 15, that is, a large load is applied on the support shaft 7 supporting the loading platform 15, for example, even if the limit change switch 29 is operated by the operator, the speed limit can be set at the first speed limit or less. As a result, deterioration of durability and life of the support shaft 7 can be suppressed, and a replacement period of the support shaft 7 can be extended and thus, durability and reliability of the dump truck 1 can be improved.

It should be noted that if it is determined that the loading platform 15 is seated on the vehicle body 2 on the basis of the detection result of the seated state sensor 28, the speed limit is not set (speed is not limited).

The dump truck 1 according to this embodiment has the configuration as described above, and its operation will be described below.

When the operator who got on the cab 8 of the dump truck 1 starts the engine 9, power is generated by the main power generator 10 and the auxiliary power generator 11. The power generated by the auxiliary power generator 11 is fed to the controller 30 via the battery 12. The power generated by the main power generator 10 is fed to the left and right wheel drive motors 13 via the motor control device 14. When the dump truck 1 is to be driven to run, a driving current is supplied to each of the wheel drive motors 13 on the rear wheel 5 side from the motor control device 14 on the basis of the control signal of the controller 30 corresponding to an operation amount of the accelerator pedal and the like by the operator.

When the earth and sand 3 are to be transported by the dump truck 1, in the state in which the loading platform 15 is held at the lowering position (transport position) illustrated in FIG. 1, the earth and sand 3 excavated by using a hydraulic excavator (not shown) is loaded on the loading platform 15, and the dump truck 1 runs to a desired unloading site. At the unloading site, the operator in the cab 8 tilts and operates the operating lever 26A of the operating lever device 26 to the raising position. As a result, the loading platform 15 rotationally moves to the raising position (soil discharging position) illustrated in FIG. 2 by using the support shaft 7 as a fulcrum, and the earth and sand 3 slip down along the tilted loading platform 15 and are discharged to the unloading site. After the discharging work of the earth and sand 3 is finished and the operator tilts and operates the operating lever 26A to the floating position or the lowering position, the loading platform 15 rotationally moves to the lowering position (transport position) shown in FIG. 1 by using the support shaft 7 as a fulcrum and is seated on the vehicle body 2.

Next, running speed limit processing of the dump truck 1 by the controller 30 will be described by referring to FIG. 4.

Figure 4:
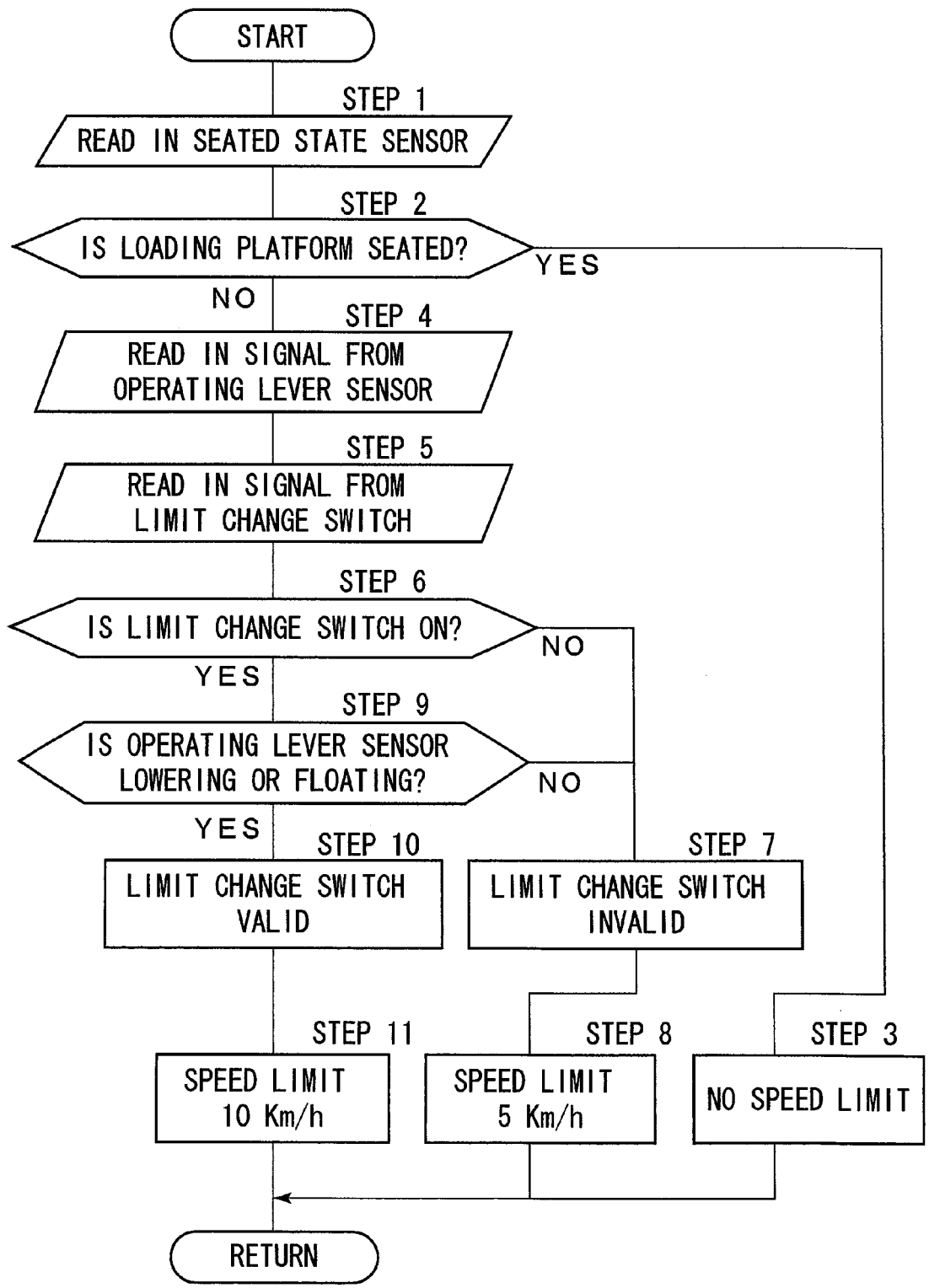
FIG. 4 is a flowchart illustrating control processing by a controller in FIG. 3.

When the processing operation in FIG. 4 is started by starting of the engine 9, at Step 1, the seated state of the loading platform 15 is read in by the seated state sensor 28. At Step 2, it is determined whether the loading platform 15 is seated or not. That is, at Step 2, it is determined whether the detection signal of the seated state sensor 28 read in at Step 1 is seated or unseated. If it is determined to be "YES", that is, that the loading platform 15 is seated at this Step 2, the processing proceeds to Step 3. In this case, since the loading platform 15 is seated, the speed limit is not set (no speed limit), the processing returns to Start via Return, and processing at Step 1 and after is repeated.

On the other hand, if it is determined to be "NO", that is, that the loading platform 15 is not seated (unseated) at Step 2, the processing proceeds to Step 4, and the position of the operating lever 26A is read in by the operating lever sensor 27. The position of this operating lever 26A corresponds to the command signal of the operating lever device 26.

At Step 5, the signal from the limit change switch 29 is read in, and at the subsequent Step 6, it is determined whether the limit change switch 29 is operated (ON state) or not. That is, at Step 6, it is determined whether the signal from the limit change switch 29 read in at Step 5 is an on-operation signal (ON signal) indicating that this limit change switch 29 has been operated or not. If it is determined at this Step 6 to be "NO", that is, that the limit change switch 29 has not been operated (OFF state), the running speed of the dump truck 1 is limited to the first speed limit or less which is the low speed running or specifically at 5 km/h or less.

That is, in this case, the processing proceeds from Step 6 to Step 7. At this Step 7, since the limit change switch 29 is in the OFF state, the limit change switch 29 is invalidated, and at Step 8, the speed limit for the dump truck 1 is set at 5 km/h. At this Step 8, the controller 30 outputs a signal indicating that the speed limit is 5 km/h to the motor control device 14. As a result, even if the operator largely steps on the accelerator pedal, the running speed of the dump truck 1 is prevented from exceeding 5 km/h, and the processing at Step 1 and after is repeated.

On the other hand, if it is determined to be "YES" at Step 6, that is, that the limit change switch 29 has been operated (ON state), the processing proceeds to Step 9, and it is determined whether the position of the operating lever 26A is at the lowering position or the floating position. If it is determined at this Step 9 to be "YES", that is, that the position of the operating lever 26A is at the lowering position or the floating position, even if the loading platform 15 is unseated, it is considered that the loading platform 15 is in a state tilted in a direction to be seated or already in a seated state. Thus, the running speed of the dump truck 1 is limited to the second speed limit or less faster than the first speed limit or more specifically at 10 km/h or less.

That is, in this case, the processing proceeds from Step 9 to Step 10, where the limit change switch 29 is validated, and at Step 11, the speed limit of the dump truck 1 is set at 10 km/h. In other words, if the speed limit is limited to 5 km/h which is the first speed limit by the previous processing, for example, the speed limit is changed to 10 km/h which is the second speed limit (change is allowed) by this processing at Step 9. In any case, at Step 1, the controller 30 outputs a signal indicating that the speed limit is 10 km/h to the motor control device 14. As a result, even if the operator largely steps on the accelerator pedal, the running speed of the dump truck 1 is prevented from exceeding 10 km/h, and the processing at Step 1 and after is repeated.

On the other hand, if it is determined at Step 9 to be "NO", that is, that the position of the operating lever 26A is at the raising position or the holding position, it is considered that the loading platform 15 is unseated and that a state in which the loading platform 15 is raised is continued (maintained). In this case, if the speed limit is changed to 10 km/h which is the second speed limit in accordance with the on-operation signal (ON signal) of the limit change switch 29, though the earth and sand 3 are loaded on the loading platform 15 and the loading platform 15 is tilted, there is a concern that the dump truck 1 runs at the second speed limit faster than the first speed limit. As a result, the dump truck 1 would run at the second speed limit which is faster than the first speed limit in a state in which a large load is applied to the support shaft 7, and there is a concern that durability and life of the support shaft 7 are deteriorated.

Thus, if it is determined at Step 9 to be "NO", that is, that the position of the operating lever 26A is at the raising position or the holding position, the processing proceeds from Step 9 to Step 7. At this Step 9, even if the on-operation signal (ON signal) is outputted from the limit change switch 29, it is invalidated, and at Step 8, the speed limit of the dump truck 1 is set at 5 km/h which is the first speed limit. In other words, even if the limit change switch 29 is turned ON, change of the speed limit to the second speed limit faster than the first speed limit is prohibited, and the processing at Step 1 and after is repeated.

As a result, if a large load is applied to the support shaft 7 such that the loading platform 15 is unseated and that the earth and sand 3 are loaded on the loading platform 15, the running speed of the dump truck 1 can be limited to the first speed limit or less. As a result, deterioration of durability and life of the support shaft 7 can be suppressed.

Thus, according to this embodiment, durability and reliability of the dump truck 1 can be improved. That is, if the loading platform 15 is not seated on the vehicle body 2 and that the operator has not operated the limit change switch 29, the running speed is limited to the first speed limit or less (5 km/h or less) which is the low speed running by the processing at Steps 6 and 8. Moreover, even if the operator has operated the limit change switch 29, if the loading platform 15 is not seated on the vehicle body 2 and the operating lever 26A is at the raising position or the holding position, the running speed is limited to the first speed limit or less (5 km/h or less) which is the low speed running by the processing at Steps 6, 9, and 8. That is, change of the speed limit to the second speed limit (10 km/h) faster than the first speed limit (5 km/h) is prohibited.

Therefore, in the state in which the loading platform 15 is not seated on the vehicle body 2 and in the state in which the loading platform 15 is raised can be continued (raising position, holding position), even if the operator operates the limit change switch 29, running at a speed exceeding the first speed limit (5 km/h) is prevented by the processing at Steps 2, 6, 9, and 8. Thus, in the state in which a large load is applied on the support shaft 7 such that the loading platform 15 is not seated on the vehicle body 2 and the earth and sand 3 are loaded on the loading platform 15, running at a speed exceeding the first speed limit (5 km/h) can be prevented. As a result, deterioration of durability and life of the support shaft 7 can be suppressed, and a replacement period of the support shaft 7 can be extended and thus, durability and reliability of the dump truck 1 can be improved.

It should be noted that if the loading platform 15 is not seated on the vehicle body 2 and the position of the operating lever 26A is at the lowering position or the floating position for seating the loading platform 15, correspondingly to the on-operation signal (ON state) of the limit change switch 29 by the operator, the speed limit is changed to the second speed limit (10 km/h) faster than the first speed limit (5 km/h) by the processing at Steps 2, 6, 9, and 11. In this case, the dump truck 1 can run at a speed not more than the second speed limit desired by the operator.

According to this embodiment, by constituting the limit change switch 29 by a momentary switch, it is configured such that the speed limit cannot be changed unless the operator keeps on pressing the limit change switch 29. As a result, such a situation that the limit change switch 29 is inadvertently operated (the ON state is continued) even though the operator does not want to change the speed limit can be suppressed, and possibility of an erroneous operation by the operator can be reduced.

According to this embodiment, since the first speed limit is set at 3 to 7 km/h (or more preferably at 5 km/h), durability and life of the support shaft 7 can be ensured. On the other hand, since the second speed limit is set at 8 to 12 km/h (or more preferably 10 km/h), if the operator wants to change the speed limit, the vehicle can run at the running speed required by the operator.

It should be noted that in the aforementioned embodiment, the processing at Steps 2, 6, 8, 9, and 11 illustrated in FIG. 4 illustrates a specific example of the speed limiting unit which is a constituent feature of the present invention.

In the aforementioned embodiment, the case configured such that the hoist cylinder 16 extending or contracting by using the pressurized oil as a power source is used as the loading platform tilting device is explained as an example. However, the present invention is not limited to that, and other types of driving devices such as an electric actuator, an electric motor and the like using electric power as a power source which can tilt the loading platform can be configured to be used as the loading platform tilting device, for example.

In the aforementioned embodiment, the case in which the pressurized oil from the control valve device 22 constituted by a hydraulic pilot type directional control valve is configured to be supplied/discharged with respect to the hoist cylinder 16 as the loading platform tilting device, and as the command signal output unit, the operating lever device 26 outputting the pilot pressure as the command signal to the control valve device 22 is used is explained as an example. However, the present invention is not limited to that, and the control valve device may be constituted by an electromagnetic valve (a solenoid type directional control valve), and an electric operating lever device outputting an electric signal as the command signal may be used as the command signal output unit, for example.

In the aforementioned embodiment, the case configured such that the seated state sensor 28 is used as a seated state detector for detecting a state in which the loading platform 15 is seated on the vehicle body 2 is explained as an example. However, the present invention is not limited to that, and various types of detectors (sensors, switches and the like) such as a tilting angle sensor for detecting a tilting angle of the loading platform, a stroke sensor for detecting a stroke length of the hoist cylinder and the like can be used as the seated state detector, for example, as long as the state in which the loading platform is seated on the vehicle body can be detected.

In the aforementioned embodiment, the example configured such that the control valve device 22 is constituted by one (single) directional control valve having 4 ports and 4 positions is explained as an example. However, the present invention is not limited to that, and the control valve device may be configured by combining a plurality of directional control valves or more specifically, two directional control valves each having 6 ports and 3 positions as in the configuration described in Japanese Patent Laid-Open No. 2009-208510 A, for example.

Moreover, in the aforementioned embodiment, the dump truck 1 of a rear-wheel driving type is explained as an example of the conveyance vehicle. However, the present invention is not limited to that and may be applied to a front-wheel driving type or a four-wheel driving type dump truck in which front and rear wheels are both driven or may be applied to conveyance vehicles other than the dump truck provided with a driving wheel. Moreover, the present invention can be applied also to a crawler type conveyance vehicle.

DESCRIPTION OF REFERENCE NUMERALS

1: Dump truck (Conveyance vehicle)
2: Vehicle body
15: Loading platform
16: Hoist cylinder (Loading platform tilting device)
22: Control valve device
26: Operating lever device (Command signal output unit)
28: Seated state sensor (Seated state detector)
29: Limit change switch
30: Controller

The invention claimed is:

1. A conveyance vehicle comprising:
an automotive vehicle body;
a loading platform capable of tilting in upward and downward directions by using a rear side of said vehicle body as a fulcrum;
a loading platform tilting device disposed between said loading platform and said vehicle body and tilting said loading platform upward or downward;
a command signal output unit configured to output a command signal to said loading platform tilting device according to an operation of an operating lever for tilting said loading platform in the upward and downward directions;
a seated state detector configured to detect a state in which said loading platform is seated on said vehicle body;
a running speed limiting unit configured to limit a running speed of said vehicle body if it is determined that said loading platform is not seated on the basis of a detection result of said seated state detector; and
a limit change switch allowing a change of limitation on a running speed by said running speed limiting unit by an operation of an operator,
wherein said command signal output unit is configured to output a raising command signal for rotationally moving said loading platform upward, a lowering command signal for rotationally moving said loading platform downward, a floating command signal for allowing said loading platform to fall by its own weight on said loading platform side, and a maintaining command signal for stopping movement of said loading platform according to the operation of said operating lever,
wherein said running speed limiting unit limits the running speed of said vehicle body to a first speed limit or less which is low speed running if it is determined that said loading platform is not seated and also that said limit change switch has not been operated,
said running speed limiting unit changes the speed limit to a second speed limit which is faster than said first speed limit if it is determined that said loading platform is not seated, that said limit change switch has been operated, and that a command signal of said command signal output unit according to the operation of said operating lever is the lowering command signal or the floating command signal, and
said running speed limiting unit prohibits change of the speed limit from said first speed limit to said second speed limit if it is determined that said loading platform is not seated, that said limit change switch has been operated, and that the command signal of said command signal output unit according to the operation of said operating lever is the raising command signal or the maintaining command signal.

2. The conveyance vehicle according to claim 1, wherein said limit change switch is constituted by a momentary switch which is kept ON while said operator presses said momentary switch and is automatically returned to an OFF state when the operator releases said momentary switch.

3. The conveyance vehicle according to claim 1, wherein said first speed limit is set to 3 to 7 km/h and said second speed limit is set to 8 to 12 km/h.

4. The conveyance vehicle according to claim 1, wherein said loading platform tilting device is a hoist cylinder operated by supply and discharge of a pressurized oil from a control valve device comprises a hydraulic pilot type directional control valve, and
wherein said command signal output unit comprises an operating lever device for outputting a pilot pressure as a command signal to said control valve device.

* * * * *